United States Patent [19]

Yokoyama et al.

[11] Patent Number: 4,557,592

[45] Date of Patent: Dec. 10, 1985

[54] EXPOSURE-SCANNING APPARATUS

[75] Inventors: Yasuyuki Yokoyama, Hachioji; Takayoshi Hatano, Koganei; Kenji Suzuki, Tachikawa; Koichiro Fujioka, Yokohama, all of Japan

[73] Assignee: Iwatsu Electric Co., Ltd., Tokyo, Japan

[21] Appl. No.: 584,096

[22] Filed: Feb. 27, 1984

[30] Foreign Application Priority Data

Mar. 8, 1983 [JP] Japan ................................ 58-036594

[51] Int. Cl.⁴ ............................................. G03B 27/48
[52] U.S. Cl. .......................................... 355/51; 355/8; 355/11
[58] Field of Search ...................... 355/50, 51, 1, 8, 11

[56] References Cited

U.S. PATENT DOCUMENTS

| | | | |
|---|---|---|---|
| 3,776,629 | 12/1973 | Ogawa | 355/8 |
| 4,008,954 | 2/1977 | Ogawa et al. | 355/1 |
| 4,092,066 | 5/1978 | Kawai | 355/51 |
| 4,103,991 | 8/1978 | Kramer | 355/51 |
| 4,129,376 | 12/1978 | Yoksukura | 355/51 |
| 4,415,258 | 11/1983 | Rees et al. | 355/8 |

Primary Examiner—Monroe H. Hayes
Attorney, Agent, or Firm—Paul & Paul

[57] ABSTRACT

An exposure-scanning apparatus in which an erect, equal-sized light image of an original document is focused on an image-receiving sheet. The apparatus comprises a transparent platen maintained stationary to support the original document. A scanning box is arranged to advance and then to return between first and second positions in parallel to the platen. An optical-exposure unit is arranged to move together with the scanning box. As the scanning box advances, the image-receiving sheet is advanced by means of a sheet-transport device in a direction the same as that of the scanning box at a speed twice that of the advance of the scanning box. A pair of push rollers are rotatably supported on the scanning box to push the image-receiving sheet onto the sheet-transport device at positions immediately before and after the light-image forming region in a direction of advance of the scanning box. The image-receiving sheet may be a photosensitive paper having a photoconductive surface.

17 Claims, 7 Drawing Figures

EXPOSURE-SCANNING APPARATUS

BACKGROUND OF THE INVENTION

1. Field of the Invention

The present invention relates to an exposure-scanning apparatus for focusing an erect, equal-sized light image of an original document on an image-receiving sheet.

2. Description of the Prior Art

Exposure-scanning apparatuses are used in electrophotographic printing machines of the direct-exposure type. These machines reproduce original documents on image-receiving sheets having a photoconductive surface such as photosensitive paper, without using image-transmitting elements such as photoconductive drums or belts.

In direct-exposure type electrophotographic printing machines, the photoconductive surface of an image-receiving sheet is charged by a charging device. Then, a charged photoconductive surface is exposed to an erect, equal-sized light image of an original document by means of the exposure-scanning apparatus, thereby forming an electrostatic latent image. After exposure, the electrostatic latent image is developed by a developing unit, and then, a developed image is fixed on the image-receiving sheet. This image-receiving sheet, may then be used as a master plate for an offset printing machine.

In the conventional exposure-scanning method for focusing an erect, equal-sized light image of an original document on an image-receiving sheet, use has been made of an optical exposure system comprising a combination of a focusing optical transmission body, such as a bundle of focusing optical fibers, and a light-reflecting mirror having an odd number of reflecting surfaces. Here, the original document and the image-receiving sheet are moved in opposite directions relative to and parallel with the optical exposure system. This means that if the original document is maintained stationary, the optical exposure system would have to be moved at one given speed and the image-receiving sheet would have to be moved in the same direction at a speed twice that of the optical exposure system.

Based on this principle, there have been proposed exposure-scanning appratuses wherein the original document and the image-receiving sheet are moved in opposite directions while the optical exposure system is maintained stationary, and exposure-scanning apparatuses wherein the original document is maintained stationary and the optical exposure system and image-receiving sheet are moved in the same direction.

A direct-exposure type electrophotographic machine adopting the former type of exposure-scanning apparatus is disclosed in, for example, Japanese Examined Patent Publication (Kokoku) No. 56-39468. The former type of apparatus, however, suffers from problems in the timing of movement of the original document and the image-receiving sheet and deviation of the center axis of the original document from that of the image-receiving sheet.

A direct-exposure type electrophotographic machine adopting the latter type of exposure-scanning apparatus is disclosed in, for example, Japanese Unexamined Patent Publication (Kokai) No. 53-56208. In the latter type of apparatus, the image-receiving sheet is placed on an endless belt and moved in the same direction as that of the optical exposure system at twice the speed. Accordingly, the unstable position of the image-receiving sheet on the belt, frequently results in floating or misalignment of the sheet during exposure and scanning.

SUMMARY OF THE INVENTION

It is an object of the present invention to provide an exposure-scanning apparatus for focusing an erect, equal-sized light image of an original document on an image-receiving sheet, which eliminates the drawbacks of the prior art apparatuses.

Another object of the present invention is to provide an exposure-scanning apparatus for a direct-exposure type electrophotographic printing machine, which can form a distinct, high quality, erect, equal-sized light image of an original document on a charged photoconductive surface of an image-receiving sheet.

In accordance with the present invention, there is provided an exposure-scanning apparatus for focusing an erect, equal-sized light image of an original document on an image-receiving sheet, comprising: a transparent platen maintained stationary to support the original document; means for illuminating the original document supported on the platen; a scanning box reciprocatively movable in parallel to the platen between a predetermined first position and a predetermined second position; means for advancing the scanning box from the first position toward the second position at a predetermined constant speed and then returning the box toward the first position; a sheet-transport means for supporting the image-receiving sheet and advancing the sheet in a direction the same as that of the advance of the scanning box at a speed twice that of the advance of the scanning box; an optical-exposure means for receiving light rays transmitted from the original document and focusing an erect, equal-sized light image of the original document on the image-receiving sheet supported on the sheet-transport means during the advance of image-receiving sheet, the optical-exposure means being arranged to move together with the scanning box at the same speed; and a pair of spaced push rollers for pushing the image-receivng sheet onto the sheet-transport means at positions immediately before and after the light image formed on the image-receiving sheet in a direction of advance of the sheet, the push rollers suuported on the scanning box to rotate freely.

According to the present invention, an image-receiving sheet can be pushed at positions immediately before and after an image-forming region of the image-receiving sheet onto the sheet-transport means during an exposure-scanning operation by means of the two push rollers, which move together with the optical-exposure means. Therefore, misalignment or floating of the image-receiving sheet during exposure-scanning operation can be prevented.

BRIEF EXPLANATION OF THE DRAWINGS

These and other objects and features of the present invention will become apparent from the following description of nonlimitative examples, given with reference to the accompanying drawings, in which.

DESCRIPTION OF THE PREFERRED EMBODIMENT

Figure 1:
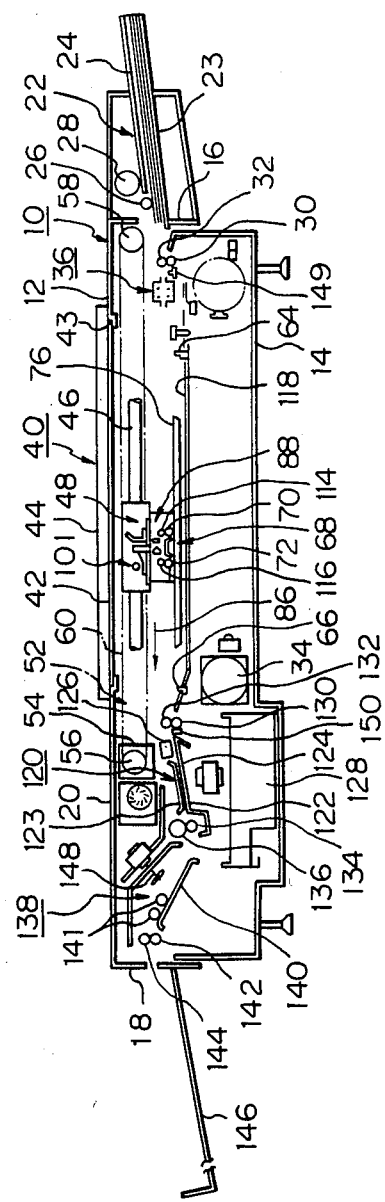
FIG. 1 is a schematic sectional view of an electrophotographic printing machine utilizing an exposure-scanning apparatus according to a preferred embodiment of the present invention.

FIG. 1 shows a direct-exposure type electrophotographic printing machine which employs an exposure-scanning apparatus according to a preferred embodiment of the present invention. Referring to FIG. 1, the electrophotographic printing machine comprises a casing 10 consisting of an upper shell 12 and a lower shell 14, connected to the upper shell 12 through a hinge (not shown). The upper shell 12 has opposite side walls 16 and 18 and an upper wall 20 extending horizontally between the side walls 16 and 18.

A sheet-supply unit 22 includes a cassette-type stacker 23, removably mounted on the side wall 16. A plurality of image-receiving sheets are stacked on the stacker 23. In this embodiment, the image-receiving sheets comprise paper 24 having an upper surface specially treated with a photoconductive material. The paper 24 is used as a master plate for an offset printing machine after being treated by the electrophotographic printing machine.

A rotatable sheet feeder 26 is arranged to engage the uppermost paper 24 within the stacker 23 and is coupled to a feed motor 28. As the sheet feeder 26 is rotated by the motor 28, the uppermost paper 24 is fed out from the stacker 23 and caught by a pair of lower and upper pinch rollers 30 and 32. The pinch rollers 30 and 32 are rotatably supported on the lower shell 14. The lower pinch roller 30 is coupled to a transport motor 34 through a rotation transmission means (not shown). The transport motor 34 is mounted on the lower shell 14. As the lower pinch roller 30 is rotated by the motor 34, the paper 24 is advanced through a charging unit 36 mounted on the lower shell 14 within the casing 10. The photoconductive surface of the paper 24 is negatively charged by the charging unit 36.

Then, the charged photoconductive surface of the paper 24 is exposed to an erect, equal-sized light image of an original document 38 (shown in FIG. 2) by an exposure-scanning apparatus 40 so as to form thereon an electrostatic latent image.

Referring to FIGS. 1 through 4, the exposure-scanning apparatus 40 comprises a transparent platen 42 mounted stationary on the upper wall 20 of the upper shell 12 around an aperture 43 formed in the wall 20. A cover plate 44 is mounted on the upper wall 20 of the upper shell 12 through hinge (not shown) to cover both the upper surfaces of the platen 42 and the original document 38 disposed thereon. A pair of spaced guide rails 46 (one only shown in FIGS. 1 and 3) are mounted on the upper shell 12 within the casing 10 and extend in parallel to each other and to the platen 42. A scanning box 48 is arranged beneath the platen 42 within the casing 10 and is slidably supported on the rails 46 through bearings 50 (only one shown in FIG. 3) mounted on opposite ends of the scanning box 48.

Figure 3:
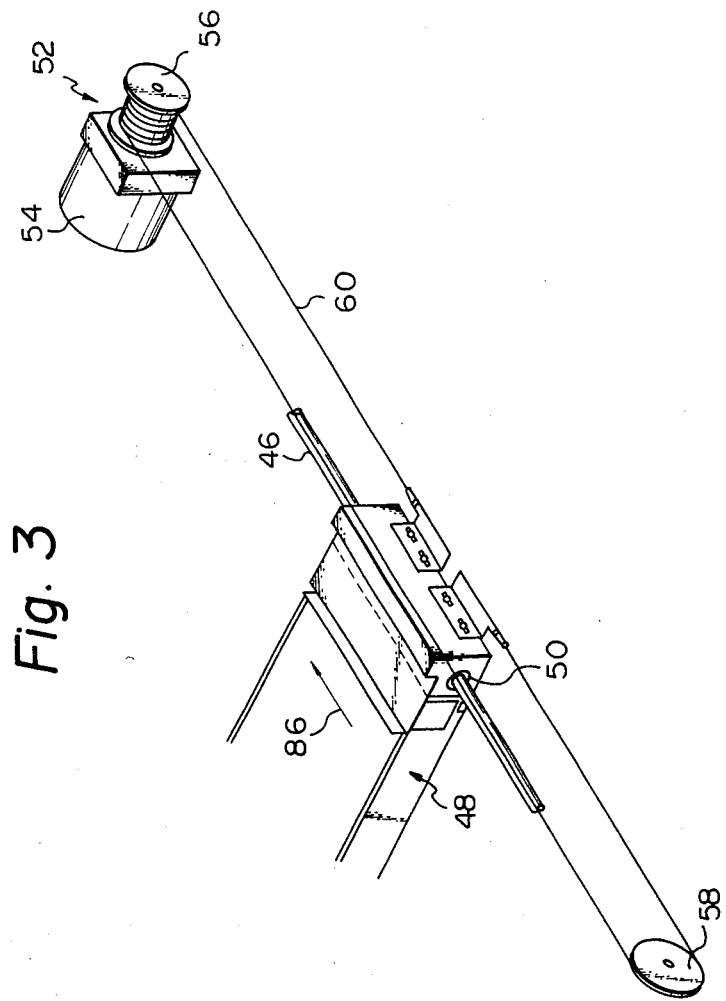
FIG. 3 is a perspective view of a scanning-box drive device of the exposure-scanning apparatus shown in FIG. 1.

A scanning-box drive device 52 is arranged within the casing 10 to advance the scanning box 48 from a predetermined first position adjacent to the charging unit 36 toward a predetermined second position adjacent to a developing unit (described hereinafter) at a predetermined constant speed and, then, to return it toward the first position. As shown in FIG. 3, the drive device 52 comprises a motor 54, two spaced reels 56 and 58, and a drawing wire 60. The motor 54 is mounted on the upper shell 12 and coupled to the reel 56. The reels 56 and 58 are rotatably supported on the upper shell 12. The drawing wire 60 is wound around the reels 56 and 58. Opposite ends of the wire 60 are fixed to the scanning box 48. Preferably, the wire 60 is wound a number of turns around at least one of the reels 56 and 58 so as to prevent slipping. The first and second positions of the scanning box 48 are detected by detectors 64 and 66, which may be, for example, photoswitches or limit switches and which are mounted on the lower shell 14, as shown in FIG. 1.

Figure 2:
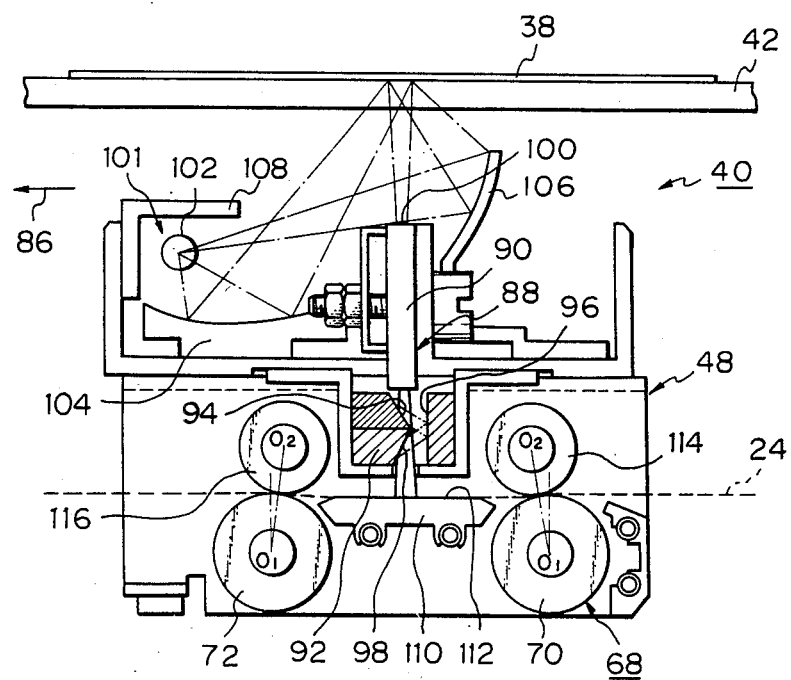
FIG. 2 is a sectional view of the main parts of the exposure-scanning apparatus shown in FIG. 1.
Figure 4:
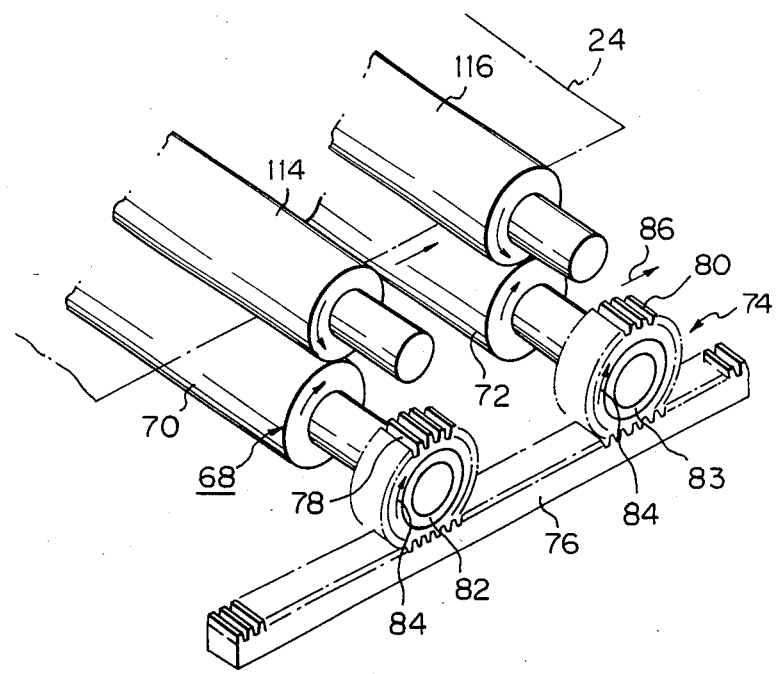
FIG. 4 is a perspective view of a part of a sheet-transport unit of the exposure-scanning apparatus shown in FIG. 1.

As shown in FIGS. 1, 2, and 4, the exposure-scanning apparatus 40 comprises a sheet-transport device 68 for supporting the paper 24 fed out from the charging unit 36 and advancing the paper 24 in the same direction as that of the advance of the scanning box 48 at a speed twice that of the advance of the scanning box 48. The sheet-transport device 68 comprises a pair of spaced feed rollers 70 and 72 and a rotating device 74. The feed rollers 70 and 72 are rotatably supported on the scanning box 48 so as to move together therewith. As shown in FIG. 4, the rotating device 74 comprises a rack 76, extending in parallel to the rails 46, and pinions 78 and 80, which are mounted to one end of the feed rollers 70 and 72 through one-way clutches 82 and 83, respectively, so as to always mesh with the rack 76. The pinions 78 and 80 are rotated in opposite directions about the axes thereof upon advance and return of the scanning box 48. The one-way clutches 82 and 83 are formed to transmit the rotational movement of the pinions 78 and 80 in the arrow direction 84 (shown in FIG. 4) to the feed rollers 70 and 72 upon advance of the scanning box 48 in the direction of arrow 86 (shown in FIGS. 1 through 4). Therefore, as the scanning box 48 moves from the second position to the first position, the feed rollers 70 and 72 are allowed to rotate freely.

As shown in FIG. 2, the exposure-scanning apparatus 40 also comprises an optical-exposure unit 88 which is mounted on the scanning box 48 to focus the erect, equal-sized light image of the original document 38 on the upper surface, that is, a charged photoconductive surface, of the paper 24 supported on the feed rollers 70 and 72.

The optical-exposure unit 88 comprises a focusing optical transmission body 90 and a reflectig mirror 92 having an odd number of reflecting surfaces. In this embodiment, the reflecting mirror 92 has three reflecting surfaces 94, 96, and 98.

The focusing optical transmission body 90 has an image-receiving end surface 100 which faces the transparent platen 42 and extends in a direction perpendicular to that of the advance of the scanning box 48. Preferably, the focusing optical transmission body 90 is a bundle of focusing optical fibers. Each of the fibers acts as a focusing lens to transmit part of image placed at, or near, one end thereof. The fibers are grouped together in a staggered two-row array to transmit and focus a complete image of a document 38. The erect, equal-sized light image of the stationary original document 38 is formed on the charged photoconductive surface of the paper 24 during the advance of the scanning box 48 and of the paper 24. A focusing optical fiber usable in this embodiment is described in U.S. Pat. No. 3,658,407 and produced under the tradename "SELFOC" by Nippon Sheet Glass Company, Limited.

An illuminating unit 101 for illuminating the original document 38 during the advance of the scanning box 48 is mounted on the scanning box 48. The illuminating unit 101 includes a light-source lamp 102, a pair of spaced light-reflectig members 104 and 106, and a light-shielding plate 108. The lamp 102 is disposed in one side of the optical-exposure unit 88. the light-reflecting members 104 and 106 are disposed on opposite sides of the optical-exposure unit 88, to reflect light rays transmitted from the lamp 102 and to direct light rays onto the original document 38. The light-shielding plate 108 is arranged to prevent the original document 38 from being directly illuminated by the intense light rays transmitted from the lamp 102. In order to converge the reflected light rays from the light-reflecting members 104 and 106 onto a predetermined area of the original document 38, each of the light-reflecting members 104 and 106 has a concave surface. Preferably, the concave surface of the first light-reflecting member 104 arranged beneath the lamp 102 has a parabolic shape, and the concave surface of the second light-reflecting member 106 has a spherical shape. When the original document 38 consists of a plurality of pieces of different original documents adhered onto a base paper, the reproduced image generally has a shaded portion corresponding to the trailing end of an adhered piece due to the reflected light from the first light-reflecting member 104. However, this shading can be sufficiently weakened by the reflected light from the second light-reflecting mirror 106. The light rays transmitted from the lamp 102 onto the paper 24 are schematically shown by dotted and dashed lines in FIG. 2. Also, as described above, since the light-shielding plate 108 prevents the original document 38 from being directly illuminated by the intense light rays transmitted from the lamp 102, it is possible to further eliminate undesired shaded portions of the reproduced image.

As can be seen in FIG. 2, the charged photoconductive surface of the paper 24 is exposed to the light image of the original document 38 in a region intermediate between the two feed rollers 70 and 72. A guide plate 110 for supporting the paper 24 is interposed between the two feed rollers 70 and 72 and mounted on the scanning box 48. The guide plate 110 has an upper surface 112 which extends parallel to the platen 42.

A pair of spaced push rollers 114 and 116 are disposed above the feed rollers 70 and 72 and rotatably supported on the scanning box 48. The push rollers 114 and 116 are urged to push the paper 24 onto the feed rollers 70 and 72, respectively, at positions immediately before and after the light-image focusing region of the paper 24 in the direction of advance of the paper 24. That is, the paper 24 is clamped between the feed rollers and the push rollers, respectively, at positions immediately before and after the light-image focusing region of the paper 24 in the direction of advance of the paper 24 during advance of the scanning box 48 and advance of the paper 24 at twice the speed of the scanning box 48.

In this embodiment, the upper peripheral portion of the feed rollers 70 and 72 is positioned at a level slightly higher than that of the upper surface of the guide plate 110, as shown in FIG. 2. Further, the centers $O_2$ of the push rollers 114 and 116 are shifted from the centers $O_1$ of the feed rollers 70 and 72 toward the guide plate 110, respectively, by predetermined distances. Preferably, the line connecting the centers $O_1$ and $O_2$ is inclined toward the guide plate 110 by about 8° with respect to the vertical. With this arrangement, the paper is slightly bent between the two feed rollers 70 and 72 and is lightly pressed onto the upper surface 112 of the guide plate 110. Thus, the paper 24 is securely attached to the upper surface of the guide plate 110 during advance thereof.

As shown in FIG. 1, a stationary sheet guide plate 118 is arranged beneath the scanning box 48 and mounted on the lower shell 14 within the casing 10. Opposite free ends, that is a leading end and a trailing end, of the paper 24 can be supported on the stationary guide plate 118 before and after the scanning box 48 in the direction of advance thereof. The leading end portion (left end portion in FIG. 1) of the stationary guide plate 118 is inclined upward toward a developing unit 120.

As shown in FIG. 1, the developing unit 120 is mounted on the lower shell 14 within the casing 10. The developing unit 120 includes a lower electrode plate 122 and an upper electrode plate 123 which together define therebetween a transport path 124 for the paper 24. A developer supply device 126 is mounted on the lower shell 14 to supply a liquid developer stored in a tank 128 into the transport path 124 during advancement of the paper 24 therethrough. The electrostatic latent image formed on the paper 24 is developed by the developing unit 120. A pair of lower and upper pinch rollers 130 and 132 are disposed in the inlet side of the transport path 124 and rotatably mounted on the lower shell 14. The pinch rollers 130 and 132 are driven by the transport motor 34 to receive the paper 24 from the sheet transport device 68 and to advance the paper 24 through the transport path 124 of the developing unit 120. A pair of lower and upper squeeze rollers 134 and 136 are arranged in the outlet side of the transport path 124 and rotatably mounted on the lower shell 14. The lower squeeze roller 134 is driven by the transport motor 34 to squeeze the liquid developer from the developed paper 24.

A fixing unit 138 is arranged adjacent to the developing unit 120. The fixing unit 138 includes a heater plate 140 and push rollers 141 for pushing the paper 24 onto the heater plate 140. The paper 24 supplied from the squeeze rollers 134 and 136 is dried between the heater plate 140 and the push rollers 141 to fix the developed image on the paper 24. The heater plate 140 is mounted on the lower shell 14. The push rollers 141 are rotatably supported on the lower shell 14 and driven by the transport motor 34 to advance the paper 24 along the upper surface of the heater plate 140.

The paper 24 is fed out from the fixing unit 138 through a pair of lower and upper feed-out rollers 142 and 144 into an exit tray 146 mounted on the outer surface of the side wall 18 of the upper shell 12. The feed-out rollers 142 and 144 are rotatably supported on the lower shell 14 within the casing 10. The lower roller 142 is driven by the transport motor 34 to advance the paper 24 toward the exit tray 146.

A fan 148 is arranged above the heater plate 140 and mounted on the upper shell within the casing to help fix and dry the paper 24.

The speed of advance of the paper 24 within the exposure-scanning apparatus 40 is set to be substantially the same as that of the paper 24 within the charging, developing, and fixing units 36, 120, and 138.

If the peripheral speed of rotation of the feed rollers 70 and 72 becomes greater than that of the pinch rollers 30 and 32 due to manufacturing tolerances or the like, the paper 24 is subjected to an impact force due to the pull of the rollers 70 and 114 when the paper 24 leaves the rollers 30 and 32. This results in a misaligned image at the exposed portion of the paper 24. In order to prevent this, it is preferable that the peripheral speed of rotation of the feed rollers 70 and 72 be set to be slightly smaller than that of the pinch roller 30. For this purpose, the diameter of the feed rollers 70 and 72 is set to be slightly smaller than that of the pinch roller 30. When the diameter of the feed rollers 70 and 72 is, for example, 20 mm, the diameter of the lower pinch roller 30 is set to be about 21.1 mm. With this arrangement, the paper 24 is slightly loosened between the charging unit 36 and the rollers 70 and 114. However, this does not cause any problem in the exposure-scanning operation.

When the peripheral speed of rotation of the lower pinch roller 130 becomes greater than that of the feed rollers 70 and 72 due to manufacturing tolerances or the like, slippage is caused between the paper 24 and the rollers 70, 72, 114, and 116 by the pull on the paper 24 of the pinch rollers 130 and 132. This may damage the photoconductive surface or cause blurring of the image formed thereon. In order to prevent this, the paper 24 is slightly loosened between the feed roller 72 and the pinching roller 130. In the case of the embodiment of the present invention, the leading end of the paper 24 is bent down onto the stationary guide plate 118 while it is directed toward the pinch rollers 130 and 132 from the rollers 72 and 116. Accordingly, when the paper 24 is clamped between the rollers 130 and 132, it is slightly loosened between the feed roller 72 and the pinch roller 130. For this reason, damage to the paper 24 or blurring of the image formed thereon as described above may be prevented. If the amount of loosening of the paper is insufficient, the diameter of the pinch roller 130 may be set to be slightly smaller than that of the feed rollers 70 and 72 so that the peripheral speed of rotating of the pinch rollers 130 and 132 becomes slightly smaller than that of the feed rollers 70 and 72.

The exposure-scanning method and associated operation with the exposure-scanning apparatus as described above will now be described in detail with particular reference to FIG. 5(a) through FIG. 5(c).

When a start button (not shown) is pushed after placing the original document 38 on the platen 42, one paper 24 in the stacker 23 is fed to the charging unit 36 by means of the sheet feeder 26 and the pinch rollers 30 and 32. When the leading end of the paper 24 is detected by a sheet sensor 149 at the inlet side of the charging unit 36, a voltage is applied to the charging unit 36 so as to negatively charge the photoconductive surface of the paper 24 passing through the charging unit 36.

Figure 5A:
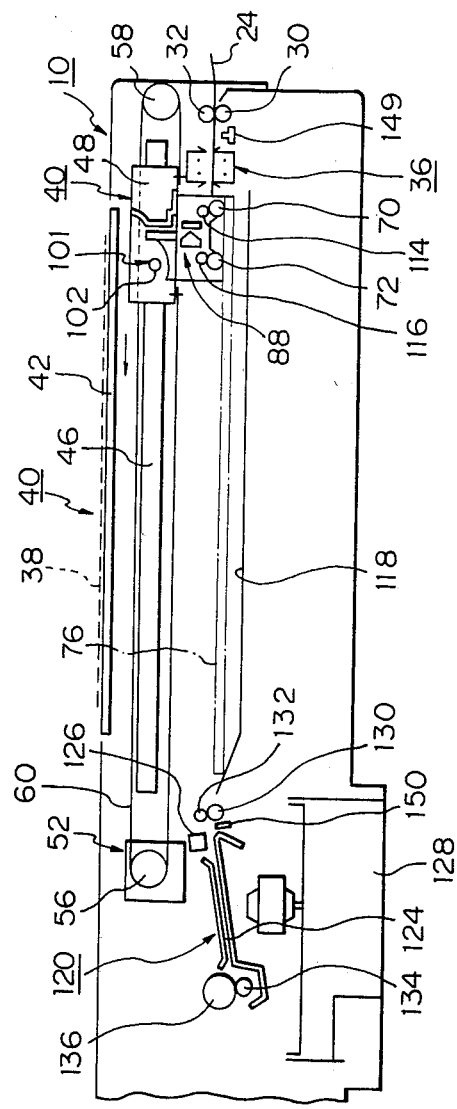
FIGS. 5(a), -5(b), and -5(c) are schematic sectional views of the electrophotographic printing machine shown in FIG. 1 in the operative condition.

As shown in FIG. 5(a), the scanning box 48 waiting at the first position, that is, the trailing end position of the reciprocative stroke, starts moving or advancing in the direction of arrow 86 before the leading end of the paper 24 reaches the rollers 70 and 114. Then, after the scanning box 48 starts advancing, the leading end of the paper 24 is held by the rollers 70 and 114. If the scanning box 48 is maintained at the first position when the paper 24 reaches the rollers 70 and 114, the leading end of the paper 24 abuts against the rollers 70 and 114 and jamming can occur. However, with the apparatus having the construction as described above, jamming can be prevented and feed of the paper 24 to the rollers 70 and 114 can be smoothly performed.

As the scanning box 48 advances in the direction of arrow 86, the feed rollers 70 and 72 are rotated counterclockwise in FIG. 5(a) about the centers thereof, respectively, at a peripheral speed which is the same as the advancing speed of the scanning box 48. Accordingly, the paper 24 is advanced at a speed twice that of the scanning box 48 by the feed rollers 70 and 72 while it is held both between rollers 70 and 114 and between rollers 72 and 116.

After the scanning box 48 starts advancing and immediately below a reference position of the original document, the lamp 102 of the illuminating unit 101 is turned on. Upon further advance of the scanning box 48, the charged photoconductive surface of the paper 24 is exposed to an erect, equal-sized light image of the original document 38, and an electrostatic latent image is recorded on the paper 24.

Figure 5B:
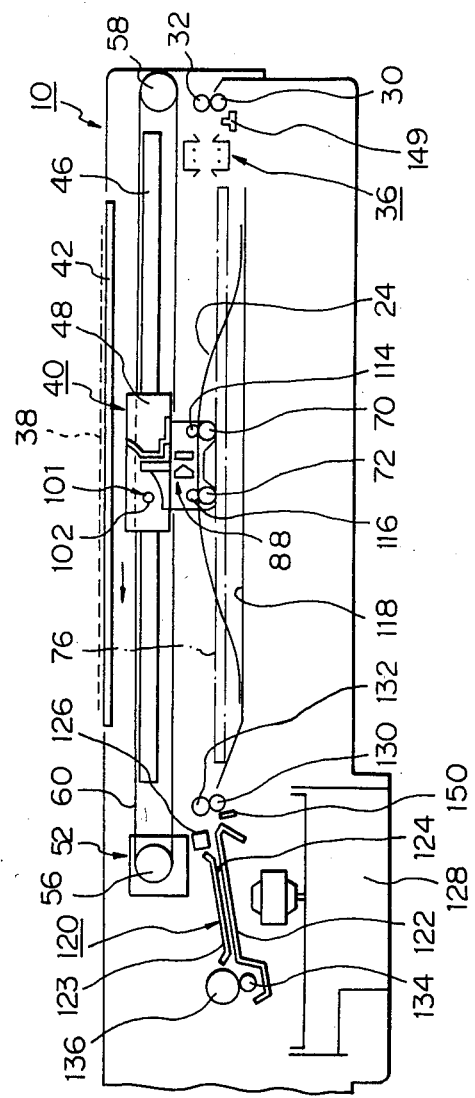

FIG. 5(b) shows a state wherein the scanning box 48 has reached a position substantially corresponding to the center of the original document 38. In this condition, the paper 24 is held both by the rollers 70 and 114 and by the rollers 72 and 116 at its central position, and the leading and trailing ends of the paper 24 are bent downward onto the stationary guide plate 118.

Figure 5C:
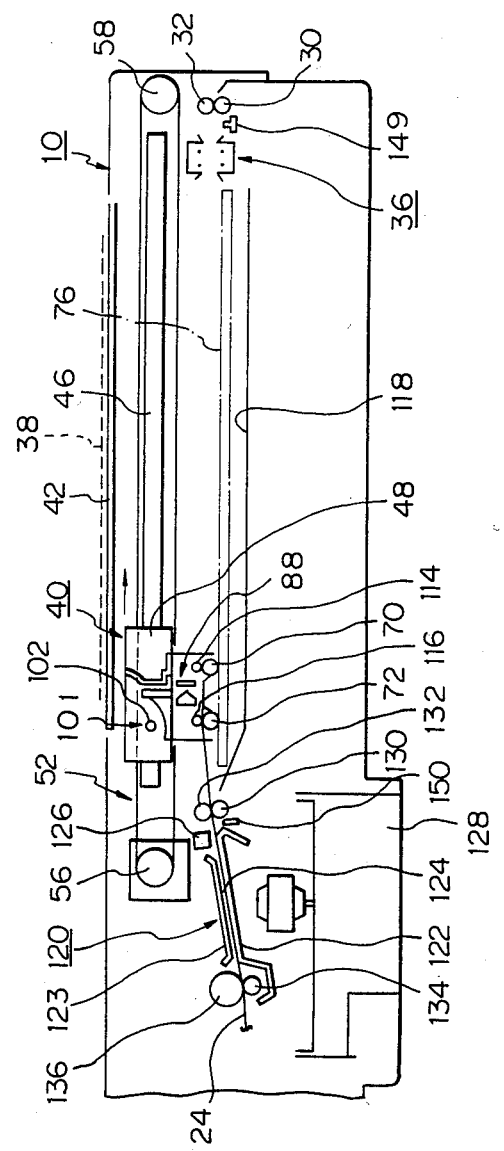

FIG. 5(c) shows a state wherein the scanning box 48 has reached the second position, that is, the leading end position of the reciprocative stroke. In this condition, the lamp 102 is turned off, and the scanning box 48 starts to return toward the first position. When the trailing end of the paper 24 is held by the rollers 72 and 116 upon return movement of the scanning box 48, the pinions 78 and 80 (only shown in FIG. 4) are rotated clockwise in FIG. 5(c) about the centers thereof, respectively. However, since the paper 24 is advanced by the rollers 130 and 132, the feed rollers 70 and 72 are rotated counterclockwise in FIG. 5(c) by means of the paper 24. Therefore, transmission of the rotational force between the pinions 78 and 80 and the feed rollers 70 and 72 is interrupted by the one-way clutches 82 and 83 (shown in FIG. 4).

When the lead end of the paper 24 is detected by a sensor 150 at the inlet side of the developing unit 120, the liquid developer begins to flow from the developer supply unit 126 toward the sheet transport path 124, and a voltage is applied between the lower and upper electrode plates 122 and 123. The electrostatic latent image of the paper 24 is developed during passage between the lower and upper electrode plates 122 and 123. After the liquid developer is drawn from the paper 24 by the squeeze rollers 134 and 136, the paper 24 is dried by the fixing unit 138, whereby the developed image of the paper 24 is fixed thereon. Then, the paper 24 is fed to the exit tray 146 (shown in FIG. 1) by the feed-out rollers 142 and 144.

Although the present invention is described with reference to a specific embodiment thereof, many alternatives, modifications, and variations will be apparent to those skill in the art. For example, one of the feed rollers 70 and 72 may be rotated by the other.

We claim:
1. An exposure-scanning apparatus for focusing an erect, equal-sized light image of an original document on a image-receiving sheet, comprising:
    a transparent platen maintained stationary to support said original document;

means for illuminating said original document supported on said platen;

a scanning box reciprocatively movable in parallel to said platen between a predetermined first position and a predetermined second position;

means for advancing said scanning box from said first position toward said second position at a predetermined constant speed and then returning the same toward said first position;

a sheet-transport means for supporting said image-receiving sheet and advancing the same in a direction the same as that of the advance of said scanning box at a speed twice that of the advance of said scanning box;

an optical-exposure means for receiving light rays transmitted from said original document and focusing an erect, equal-sized light image of said original document on said image-receiving sheet supported on said sheet-transport means during advance of said image-receiving sheet, said optical exposure means being arranged to move together with said scanning box at the same speed; and a pair of spaced push rollers for pushing said image-receiving sheet onto said sheet-transport means at positions immediately before and after said light image formed on said image-receiving sheet in a direction of advance of said sheet, said push rollers supported on said scanning box to rotate freely, wherein said sheet-transport means includes:

a pair of spaced feed rollers for supporting thereon said image-receiving sheet, said feed rollers being rotatably supported on said scanning box to move together therewith at the same speed, said push rollers being urged to push said image-receiving sheet onto said feed rollers; and a rotating means for rotating said feed rollers at a peripheral speed which is equal to the speed of advance of said scanning box during the advance of said scanning box so as to advance said image-receiving sheet supported on said feed rollers at a speed twice that of advance of said scanning box.

2. An exposure-scanning apparatus according to claim 1, wherein said image-receiving sheet has a charged photoconductive surface.

3. An exposure-scanning apparatus according to claim 1, wherein said rotating means includes: a rack maintained stationary in parallel to said platen; and pinions, each attached to one end of each of said feed rollers through a one-way clutch and always meshing with said rack, said one-way clutches transmitting rotation of said pinions to said feed rollers only upon the advance of said scanning box.

4. An exposure-scanning apparatus according to claim 1, wherein said platen is arranged horizontally, and said scanning box is arranged beneath said platen, and wherein said sheet-transport means further includes a sheet guide plate mounted on said scanning box between said feed rollers and having an upper surface for supporting thereon said image-receiving sheet during advance of said sheet.

5. An exposure-scanning apparatus according to claim 4, wherein said feed rollers have an upper peripheral portion for supporting thereon said image-receiving sheet, said upper peripheral surfaces of said feed rollers being located at a position which is higher than that of said upper surface of said sheet guide plate, and centers of said push rollers arranged above said feed rollers are shifted from centers of said feed rollers by predetermined amounts toward said sheet guide plate.

6. An exposure-scanning apparatus according to claim 4, wherein said sheet-transport means further includes a stationary sheet guide plate arranged stationary beneath said scanning box so as to support opposite free ends of said image-receiving sheet.

7. An exposure-scaning apparatus according to claim 1, wherein said optical-exposure means includes:

a light-reflecting mirror having an odd number of reflecting surfaces; and a plurality of focusing optical fibers grouped together to receive the light rays transmitted from said original document and to focus said erect, equal-sized light image of said original document onto said image-receiving sheet through said light-reflecting mirror.

8. An exposure-scanning apparatus according to claim 1, wherein said illuminating means includes:

a light source mounted on said scanning box at one side of said optical-exposure means;

a pair of spaced light-reflecting members mounted on said scanning box at opposite sides of said optical-exposure means to reflect the light rays transmitted from said light source and to direct the light rays on to said original document in a region above said optical-exposure means; and a light-shield means mounted on said scanning box to prevent said light source from directly illuminating said original document.

9. An exposure-scanning apparatus for focusing an erect, equal-sized light image of an original document on an image-receiving sheet having an image-receiving surface and a back surface, said apparatus comprising:

a transparent platen maintained stationary to support said original document;

means for illuminating said original document supported on said platen;

a scanning box reciprocatively movable in parallel to said platen between a predetermined first position and predetermined second position;

a first drive means for advancing said scanning box from said first position toward said second position at a predetermined constant speed and then returning the same toward said first position;

a sheet-transport means for advancing said sheet in a direction the same as that of the advance of said scanning box at a speed twice that of the advance of said scanning box in relation to said platen during the advance of said scanning box, said sheet-transport means being supported on said scanning box to move together with said scanning box and arranged to support therebetween said image-receiving sheet at positions immediately before and after said light image formed on said image-receiving sheet during the advance of said scanning box;

a second drive means for moving said sheet-transport means in relation to said scanning box during the advance of said scanning box so as to advance said image-receiving sheet in relation to said scanning box at a speed the same as that of the advance of said scanning box; and an optical exposure means for receiving light rays transmitted from said original document on said platen and focusing an erect, equal-sized light image of said original document on said image-receiving sheet during the advance of said sheet, said optical exposure means being arranged to move together with said scanning box.

10. An exposure-scanning apparatus according to claim 9, wherein said image-receiving sheet has a charged photoconductive surface.

11. An exposure-scanning apparatus according to claim 9, wherein said sheet-transport means includes a first feed device supported on said scanning box for supporting said back surface of said sheet, and a second transport device supported on said scanning box for supporting said image-receiving surface of said sheet at positions immediately before and after the light image formed on said image-receiving surface of said sheet, said second drive means being connected to at least one of said first and second transport devices.

12. An exposure scanning apparatus according to claim 11, wherein each of said first and second transport devices includes a pair of spaced feed rollers rotatably supported on said scanning box, at least one of said feed rollers being rotated by said second drive means at a peripheral speed which is equal to that of the advance of said scanning box during the advance of said scanning box so as to advance said sheet in relation to said scanning box at a speed the same as that of the advance of said scanning box, another one pair of said feed rollers being pushed against said one pair of said feed rollers through said image-receiving sheet.

13. An exposure-scanning apparatus according to claim 12, wherein said second drive means includes a rack maintained stationary and in parallel to said platen, and pinions connected to at least one pair of said feed rollers through one way clutches and always in mesh with said rack, said one-way clutches transmitting rotation of said pinions to said corresponding feed rollers only upon the advance of said scanning box.

14. An exposure-scanning apparatus according to claim 12, wherein said first transport device arranged beneath said optical exposure means further includes a sheet guide plate mounted on said scanning box between said feed rollers of said first transport device, said sheet guide plate having an upper surface for supporting thereon said image-receiving sheet during the advance of said sheet.

15. An exposure-scanning apparatus according to claim 14, wherein each of said feed rollers of said first transport device has an upper peripheral portion for supporting thereon said back surface of said image-receiving sheet, said upper peripheral portions of said feed rollers of said first transport device being located at the position which is higher than that of said upper surface of said sheet guide plate, and wherein centers of said feed rollers of said second transport device are arranged above said feed rollers of said first transport device and shifted from centers of said feed rollers of said first transport device by predetermined amounts toward said sheet guide plate.

16. An exposure-scanning apparatus according to claim 9, wherein said optical-exposure means includes:
 a light-reflecting mirror having an odd number of reflecting surfaces; and
 a plurality of focusing optical fibers grouped together to receive the light rays transmitted from said original document and to focus said erect, equal-sized light image of said original document onto said image-receiving sheet through said light-reflecting mirror.

17. An exposure-scanning apparatus according to claim 9, wherein said illuminating means includes:
 a light source mounted on said scanning box at one side of said optical-exposure means;
 a pair of spaced light-reflecting members mounted on said scanning box at opposite sides of said optical-exposure means to reflect the light rays transmitted from said light source and to direct the light rays onto said original document in a region above said optical-exposure means; and
 a light shield means mounted on said scanning box to prevent said light source from directly illuminating said original document.

* * * * *